United States Patent
Balmakhtar et al.

(10) Patent No.: US 11,350,294 B1
(45) Date of Patent: May 31, 2022

(54) ROLLING PRODUCTION TEST

(71) Applicant: T-MOBILE INNOVATIONS LLC, Overland Park, KS (US)

(72) Inventors: Marouane Balmakhtar, Fairfax, VA (US); Serge M. Manning, Plano, TX (US)

(73) Assignee: Sprint Communications Company L.P., Overland Park, KS (US)

(*) Notice: Subject to any disclaimer, the term of this patent is extended or adjusted under 35 U.S.C. 154(b) by 23 days.

(21) Appl. No.: 17/099,704

(22) Filed: Nov. 16, 2020

(51) Int. Cl.
*H04W 24/04* (2009.01)
*H04W 24/06* (2009.01)

(52) U.S. Cl.
CPC ............ *H04W 24/04* (2013.01); *H04W 24/06* (2013.01)

(58) Field of Classification Search
CPC ...... H04W 24/04; H04W 24/06; H04L 67/28; H04L 41/0893; H04L 43/08; H04L 41/12; H04L 43/16; G11C 29/10; G11C 29/38; G11C 29/36
See application file for complete search history.

(56) References Cited

U.S. PATENT DOCUMENTS

| | | | | |
|---|---|---|---|---|
| 10,216,621 | B1* | 2/2019 | Rutten | G06F 16/2455 |
| 2018/0097696 | A1* | 4/2018 | Calo | H04L 41/5009 |
| 2019/0018671 | A1* | 1/2019 | Zhu | G06F 11/3452 |
| 2019/0028350 | A1* | 1/2019 | Yeung | H04L 9/0861 |
| 2019/0149425 | A1* | 5/2019 | Larish | G06N 3/006 706/16 |
| 2021/0089435 | A1* | 3/2021 | Bhandarkar | G06F 8/433 |
| 2021/0144517 | A1* | 5/2021 | Guim Bernat | H04L 41/0869 |
| 2021/0204154 | A1* | 7/2021 | Li | H04L 41/147 |
| 2021/0288827 | A1* | 9/2021 | Celozzi | H04M 15/00 |

* cited by examiner

*Primary Examiner* — Syed Ali

(57) ABSTRACT

A method of testing a communication network. The method comprises providing network communication service to communication service subscribers by a first set of computing resources that are part of a communication network, replicating communication data packets, directing the replicated communication data packets to the first set of computing resources and to a second set of computing resources that are part of the communication network but which do not provide network communication service to communication service subscribers, introducing a random error into the second set of computing resources, capturing by a testing application executing on a server computer the outputs from the second set of computing resources after processing the replicated communication data packets in the context of the random error, analyzing the captured outputs by the testing application, determining that the captured outputs indicate a failure by the testing application, and taking action by the testing application.

17 Claims, 9 Drawing Sheets

ROLLING PRODUCTION TEST

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer technology is widely used in modern communication networks. With the exception of radio transmitters, radio receivers, radio frequency amplifiers, antennas, power supplies, and wires, it is probably accurate to say the rest of the communication networks are provided by what may be deemed computers. The communication network computers are controlled by programs, software, code, scripts, or generally logic that is, in some form or another, crafted by fallible human beings. To reduce the risk of communication network failure due to unintended introduction of logic errors, new software is desirably thoroughly tested before it is put into service carrying live communication service subscriber traffic. The communication network that carries live subscriber traffic is sometimes referred to as a production environment. Individual logic components may desirably be tested using unit testing in a non-production environment. Systems may desirably be tested with a plurality of components or applications interworking with each other using system testing or integration testing in a non-production environment.

SUMMARY

In an embodiment, a method of testing a communication network is disclosed. The method comprises providing network communication service to communication service subscribers by a first set of computing resources that are part of a communication network, replicating communication data packets, and directing the replicated communication data packets to the first set of computing resources and to a second set of computing resources that are part of the communication network but which do not provide network communication service to communication service subscribers. The method further comprises introducing a random error into the second set of computing resources, capturing by a testing application executing on a server computer the outputs from the second set of computing resources after processing the replicated communication data packets in the context of the random error, analyzing the captured outputs by the testing application, determining that the captured outputs indicate a communication failure by the testing application, and taking action by the testing application based on the communication failure.

In another embodiment, a method of testing a service level provided by a communication network is disclosed. The method comprises replicating communication data packets, directing the replicated communication data packets to a first set of computing resources that are part of a communication network, whereby the first set of computing resources provide network communication service associated with the replicated communication data packets to communication service subscribers, and directing the replicated communication data packets to a second set of computing resources that are part of the communication network and which are configured to provide an end-to-end communication service, wherein the second set of computing resources do not provide network communication service to communication service subscribers. The method further comprises analyzing outputs of the second set of computing resources after processing the replicated communication data packets by the second set of computing resources and, based on analyzing the outputs, determining by the testing application a service level of the end-to-end communication service provided by the second set of computing resources.

In yet another embodiment, a method of testing a service level provided by a communication network is disclosed. The method comprises replicating communication data packets, directing the replicated communication data packets to a first set of computing resources that are part of a communication network, whereby the first set of computing resources provide network communication service associated with the replicated communication data packets to communication service subscribers, and directing the replicated communication data packets to a second set of computing resources that are part of the communication network and which are configured to provide an end-to-end communication service, wherein the second set of computing resources do not provide network communication service to communication service subscribers, whereby to test the end-to-end communication service. The method further comprises determining that the first set of computing resources are approaching an overloading condition, sending a first plurality of communication data packets to the first set of computing resources, whereby the first set of computing resources provide network communication service to communication service subscribers, and sending a second plurality of communication data packets to the second set of computing resources, whereby the second set of computing resources provide the end-to-end communication service to communication service subscribers.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
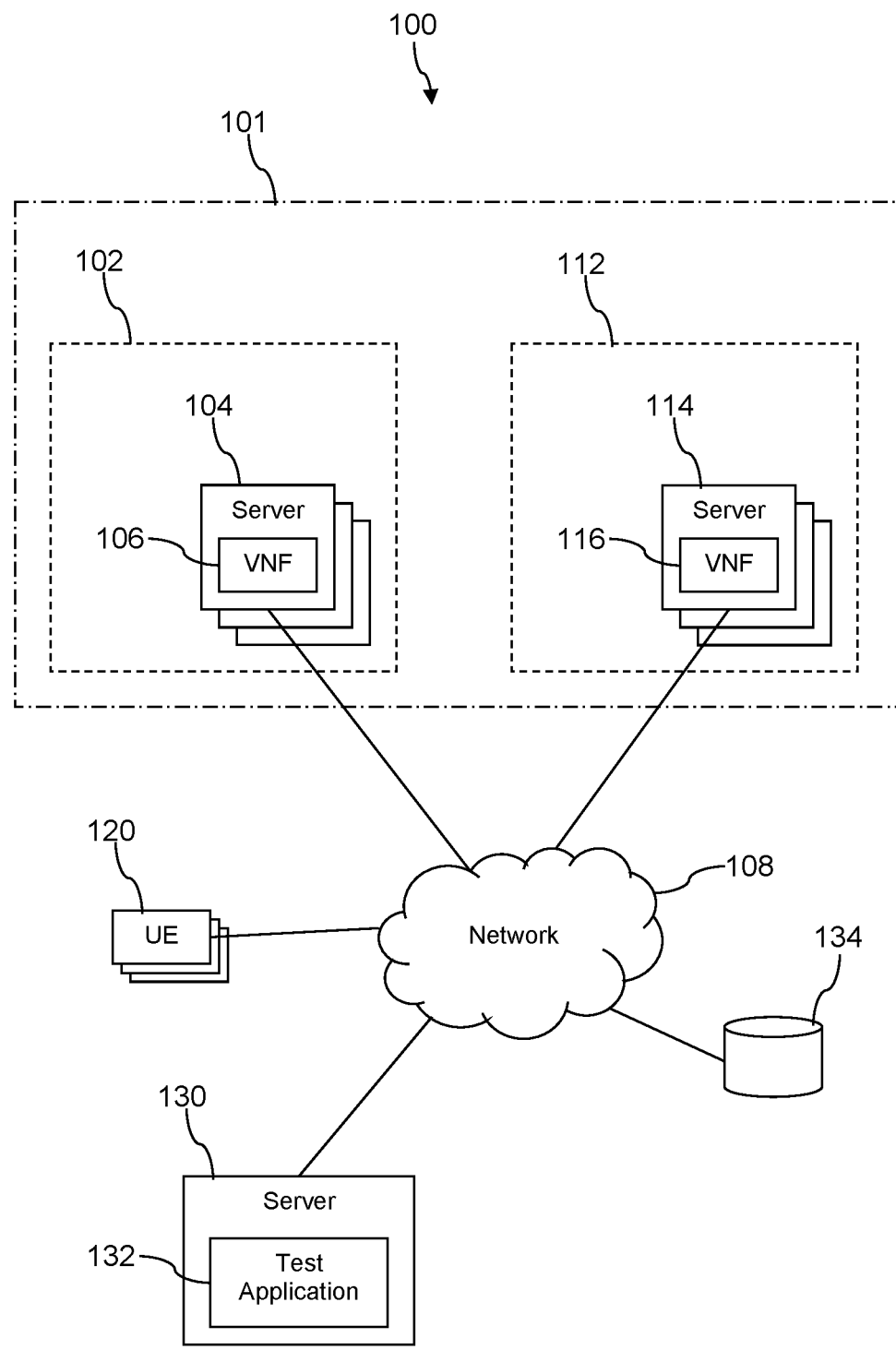
FIG. 1A is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Testing of a software load is typically conducted on a software load which is not already released for use in a production environment (e.g., a communication network infrastructure carrying live communication service subscriber traffic). The software load that is typically tested is some modification or permutation of the production load, such as an extension of functionality. The software load is tested in a test environment that is isolated and distinct from the production environment. Once a software load has been propagated to the production environment and is carrying live network traffic it is no longer the subject of testing.

The present disclosure teaches testing of production software executing in the production environment in a new form of testing which might be called rolling production testing. Rolling production testing takes place on production environment network infrastructure, by contrast with traditional testing that takes place in a test environment isolated from the production environment. Rolling production testing is conducted on a software load that has already been released to the production environment, by contrast with traditional testing that takes place on a software load that has not yet been released to production. The testing comprises, in part, introducing random errors such as introducing an error into a router. One of the benefits of this kind of testing is to determine how the network responds in the presence of adjacent failures. Production traffic is fed into portion of the production environment involved in rolling testing but the output from this portion of the production environment does not output to the live production environment (e.g., does not impact service of live communication traffic). The output of the rolling test is analyzed to determine the results of the rolling testing. In an embodiment, the analysis is not directed to determining the correctness of the outputs of the rolling production test resources but rather to determine and evaluate service level key performance indicators (KPIs) of a specific end-to-end communication service configured into the rolling production test resources.

The rolling production testing is conducted using reserve production network infrastructure (e.g., server computers) that would normally be idling and ready for prompt recruitment for picking up peak network communication loads. In rolling production testing, these idling reserve network resources (e.g., server computers) are repurposed to continuous testing. When a peak of network communication traffic is detected to be approaching, rolling production testing can be discontinued, the reserve network resources can be repurposed to handling live subscriber communication traffic to help sustain the peak network communication traffic load, and then the reserve network resources can be returned to performing rolling network testing as the communication traffic peak recedes. In some cases, the reserve network resources involved in the rolling production testing may be directly transitioned to handling subscriber communication traffic (e.g., when the network resources are already loaded with and executing instances of network functions needed to carry the peak load). In other cases, the reserve network resources involved in the rolling production testing may first have the network functions previously loaded into the reserve resources removed and needed different network functions loaded and brought into service.

The rolling production testing may be called "rolling" because the reserve network resources used for the testing change over time. For example, if 70% of network resources are typically involved in handling subscriber traffic, 30% of the network resources may be free to undergo rolling production testing. The servers that are among the 70% of network resources carrying traffic and the servers that are deemed reserve network resources and that are undergoing rolling production testing can change roles over time. For example, a production environment may comprise 10 servers. At a first time, servers 1 through 7 may be engaged in carrying traffic and servers 8 through 10 may be engaged in rolling testing. At a second time, servers 2 through 8 may be engaged in carrying traffic and servers, 9, 10, and 1 may be engaged in rolling testing. At a third time, servers 3 through 9 may be engaged in carrying traffic, and servers 10, 1, and 2 may be engaged in rolling testing. It will be appreciated that this example refers to an unrealistically small number of servers to the purpose of making the example easier to describe. A practical modern communication network infrastructure comprises thousands of servers if not tens of thousands of servers carrying live communication traffic. By rolling through all the servers in the production environment, over time, the rolling production testing can be more thorough.

At various points in the flow of communication traffic in the network infrastructure a network branch point may be introduced to replicate communication messages or service messages. One set of replicated communication messages is provided by the branch to the network resources involved in handling live traffic. Another set of replicated communication messages is provided by the branch to the network resources engaged in rolling production testing. The outputs of the resources engaged in rolling production testing are captured but not released into the portion of the network resources involved in processing live communication traffic. The outputs may be analyzed to evaluate the performance of the resources engaged in the rolling production testing. In an embodiment, the analysis is not directed to determining the correctness of the outputs of the rolling production test resources but rather to determine and evaluate service level key performance indicators (KPIs) of a specific end-to-end communication service configured into the rolling production test resources. Service level KPIs may be a network attach success rate, a mobility success rate, an average upstream data rate, an average downstream data rate, a peak data rate, a service latency, a service reliability score, a service availability score, a service setup time, a service experience quality score (e.g., MOS), and others. These service level KPIs can be compared to statistical norms to identify problems. Service level testing may compare inputs and outputs from the end-to-end service (between the consumer of the service and the provider of the service) and may not consider the inputs and outputs of the individual intermediate virtual network functions (VNFs) that compose the end-to-end service.

The capturing of the outputs of the rolling production testing and the analysis of the outputs may be performed by a rolling production testing script or application. The script or application can compare the service level KPIs to previously determined statistical norms and/or pre-defined thresholds and take action if the comparison so indicates. Taking action may be setting an alarm level on the production environment. Taking action may be sending notifications to appropriate stakeholders such as network operation center (NOC) operators and/or to network infrastructure managers. Taking action may be changing the standby reserve dispositions to increase the failover capacity of the communication network.

In an embodiment, the rolling production testing comprises introducing random errors into parts of the rolling production test resources to attempt to discover unknowns. Random errors will be introduced into the rolling production test resources, and the behavior of the production load in response to those random errors will be observed and measured. In this way, the rolling production testing may learn how the production load responds to the presence of adjacent failures or proximate failures that are not considered during conventional unit testing or system testing.

A first random error may be introduced and a first end-to-end communication service is evaluated, then a second end-to-end communication service is loaded and executed and evaluated in the context of the random error, then a third end-to-end communication service is loaded and executed and evaluated in the context of the random error. Then a second random error may be introduced and again each of the first, second, and third end-to-end communication services may be loaded, executed, and evaluated in the context of the second random error. This can be repeated on a rolled set of network resources (a different set of servers of the totality of network production servers).

Random errors may include (A) misconfiguration of a domain name service (DNS) server intended to be a secondary DNS server and then swapping domain name service (DNS) primary and secondary IP addresses, (B) injecting communication traffic delays, (C) injecting malformed data packets, (D) application function failure (e.g., an edge application or other application formally outside of the network but attached to the network for access by UEs and/or service subscribers), (E) network function failure to respond, (F) router failure, (G) simulated failure of communication link (e.g., not a router failure but failure between network nodes), (H) load balancer failure, and other random errors. End-to-end services may include UE registration, UE deregistration, UE network authentication and authorization, UE and network slice negotiation/selection, UE protocol data unit (PDU) session establishment, UE edge-based PDU session establishment, UE hand-over of PDU sessions due to mobility, UE initiates voice-over-new radio (NR) call, application function installs policies for a UE application session, and other services.

The reserve network resources and/or the rolling production testing may be cordoned off from traffic handling network resources in a variety of ways. In an embodiment, the rolling production testing may be performed in a network slice that thereby isolates the rolling production testing from the user communication traffic handling of the network infrastructure. In an embodiment, hardware resource quotas may be used to isolate rolling production testing from the traffic handling network resources. In an embodiment, virtual private networks (VPNs) may be used to isolate the rolling production testing from the traffic handling network resources. In an embodiment, separate operating system kernels may be used to isolate the rolling production testing from the traffic handling network resources. In an embodiment, network security policies and/or appliances such as firewalls may be used to isolate the rolling production testing from the traffic handling network resources. In an embodiment, separate virtual machines may be used to isolate the rolling production testing from the traffic handling network resources. In an embodiment, separate software containers may be used to isolate the rolling production testing from the traffic handling network resources. In an embodiment, two or more of the above enumerated techniques—or other techniques—may be used to isolate the rolling production testing from the traffic handling network resources.

The present disclosure teaches a rolling production testing system that is a computer implemented particular technical solution to a technical communication system problem. While software that provides communication network functionality is tested using unit testing techniques and system testing techniques prior to deployment to the production environment, software problems continue to manifest themselves and cause undesired communications outages. The rolling production testing system taught herein will detect communication network vulnerabilities and promote repairing the unknown problems before they manifest themselves in customer affecting service outages. The rolling production testing uses actual production network resources, so fidelity of the testing environment to the production environment is certain. In particular, rolling production testing can find and prompt repair of data configuration errors on production environment resources (e.g., server computers) that may not be known or may not be part of the production load. The rolling production testing recruits otherwise idling reserve network resources for the testing, thereby avoiding undesired capital equipment investment. The reserve network resources used for rolling production testing can be quickly repurposed from performing rolling production testing to servicing live communication traffic during a network peak load interval and then recovered as the peak load recedes and returned to performing rolling production testing. The rolling production testing involves rolling production resources into the reserve resource pool and returning other reserve resources back into the production resource pool in a rolling fashion, whereby to test all network resources using rolling production testing over an extended period of time.

Turning now to FIG. 1A, a communication system 100 is described. In an embodiment, system 100 comprises a production network 101. The production network 101 comprises traffic handling resources 102 and reserve resources 112. In an embodiment, the production network 101 may be part of a core network, for example a part of a 5G core network. The production network 101 may further comprise parts of a radio access network, for example virtualized radio access network components such as distributed unit (DU) and/or central unit (CU) in an access node split functionality architecture such as described below with reference to FIG. 2A, 5G networks are discussed further hereinafter with reference to FIG. 2A and FIG. 2B.

The traffic handling resources 102 comprise a plurality of server computers 104. Each of the server computers 104 may execute one or more virtual network functions (VNFs) 106. The traffic handling resources 102 may comprise other network elements that may be distinguished from server computers 104. The traffic handling resources 102 are actively handling live subscriber communication traffic. The reserve resources 112 are substantially similar to the traffic handling resources 102 except are not actively handling live subscriber communication traffic. The reserve resources 112 may be provided by a network infrastructure for the purpose of assuming traffic handling tasks during peak network traffic loading periods or as fail-over reserves when one or more servers 104 may go down unexpectedly. The reserve resources 112 comprise a plurality of server computers 114. Each of the server computers 114 may execute one or more VNFs 116. The distribution of the server computers 104, 114 to the pool of traffic handling resources 102 or to the pool of reserve resources 112 may change over time, as described further hereinafter with reference to FIG. 1B and FIG. 1C. The server computers 104, 114 may be referred to as computing resources in some contexts.

The production network 101 is communicatively coupled to a network 108. The production network 101 may be abstracted as being part of the network 108 but is drawn separately here in FIG. 1A to promote describing the features and benefits of the present disclosure with greater clarity. The network 108 comprises one or more public networks, one or more private networks, or a combination thereof. One or more user equipments (UEs) 120 receive communication services from the network 108 and/or the production network 101. A UE 120 may be a mobile phone, a smart phone, a personal digital assistant (PDA), a wearable computer, a headset computer, a laptop computer, a notebook computer, a tablet computer, or an internet of things (IoT) device. Some of the UEs 120 may be communicatively coupled to the network 108 by wireless communication links and others of the UEs 120 may be communicatively coupled to the network 108 by wired communication links.

The system 100 further comprises a server computer 130 that executes a test application 132. In an embodiment, a network branch point is established in the network 108 that replicates communication messages or services messages and sends a first set of replicated communication or service messages to the traffic handling resources 102 for providing live communication service to UEs 120 and sends a second set of replicated communication or service messages to the reserve resources 112. In an embodiment, the reserve resources 112 may be configured to conduct one or more rolling production tests that test end-to-end communication service delivery by the production load. End-to-end communication services may include UE registration, UE deregistration, UE network authentication and authorization, UE and network slice negotiation/selection, UE protocol data unit (PDU) session establishment, UE edge-based PDU session establishment, UE hand-over of PDU sessions due to mobility, UE initiates voice-over-new radio (NR) call, application function installs policies for a UE application session, and other services.

The test application 132 monitors the inputs to and the outputs from the reserve resources 112 and develops service level KPIs from the outputs. The test application 132 may store the service level KPIs in a data store 134. Service level KPIs may be a network attach success rate, a mobility success rate, an average upstream data rate, an average downstream data rate, a peak data rate, a service latency, a service reliability score, a service availability score, a service setup time, a service experience quality score (e.g., MOS), and others.

The test application 132 may develop statistical norms for the service level KPIs over time by processing the data stored in the data store 134. The test application 132 may compare the service level KPIs that it determines by monitoring the reserve resources 112 to statistical norms and/or to pre-defined thresholds. If the test application 132 determines that the service level KPIs are abnormal, the test application 132 can take action. The test application 132 may take action by setting an alarm level on the production network 101, for example an alarm that would be presented to a network operation center (NOC) operator on a dashboard. The test application 132 may send notification to one or more stakeholders of the abnormal KPI.

The test application 132 may change the allocation of resources (e.g., servers 104, 114) between the pool of traffic handling resources 102 and the pool of reserve resources 112. Alternatively, the allocation of resources between the pool of traffic handling resources 102 and the pool of reserve resources 112 may be changed by another, for example as a result of maintenance activities. For example, a server allocated to the pool of reserve resources 112 may be allocated to the pool of traffic handling resources 102 by system administrators in view of taking a server allocated to the pool of traffic handling resources 102 out of service to perform maintenance on that server. The maintained server may be rebooted and allocated to the pool or reserve resources 112.

In an embodiment, the test application 132 may establish and modify the network branch point to support rolling production testing. In an embodiment, the test application 132 may configure the reserve resources 112 to conduct rolling production testing, for example by causing the servers 114 to load and instantiate VNFs 116 to implement a desired end-to-end communication service. In an embodiment, the test application 132 may inject random errors into the reserve resources 112 to determine the robustness of the production network 101 in the presence of these random errors. Random errors may include (A) misconfiguration of a domain name service (DNS) server intended to be a secondary DNS server and then swapping domain name service (DNS) primary and secondary IP addresses, (B) injecting communication traffic delays, (C) injecting malformed data packets, (D) application function failure (e.g., an edge application or other application formally outside of the network but attached to the network for access by UEs and/or service subscribers), (E) network function failure to respond, (F) router failure, (G) simulated failure of communication links, (H) load balancer failure, and other random errors.

Figure 1B:
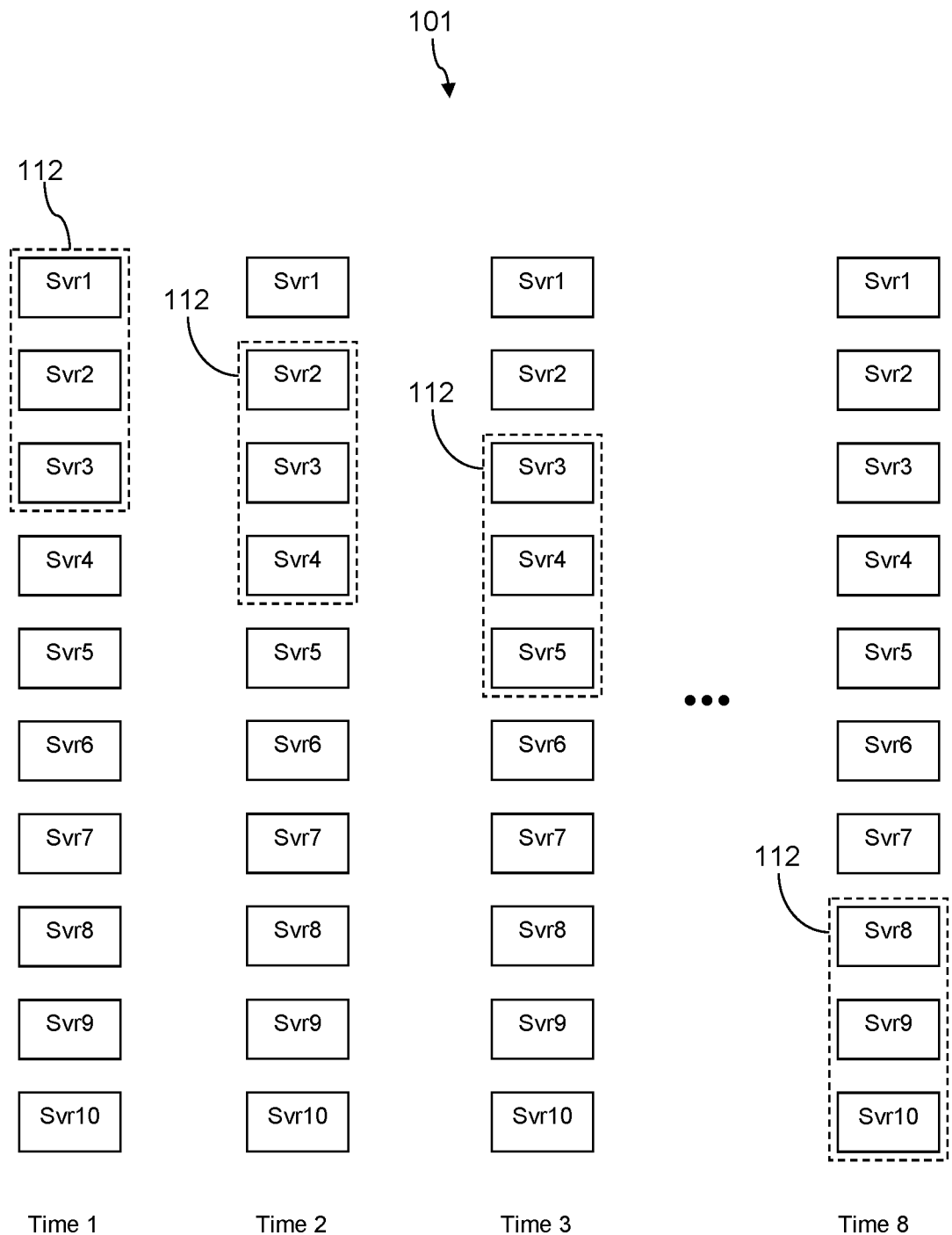
FIG. 1B and FIG. 1C are illustrations of permuting a distribution of network resources over time between traffic handling roles and rolling production testing roles according to an embodiment of the disclosure.
Figure 1C:
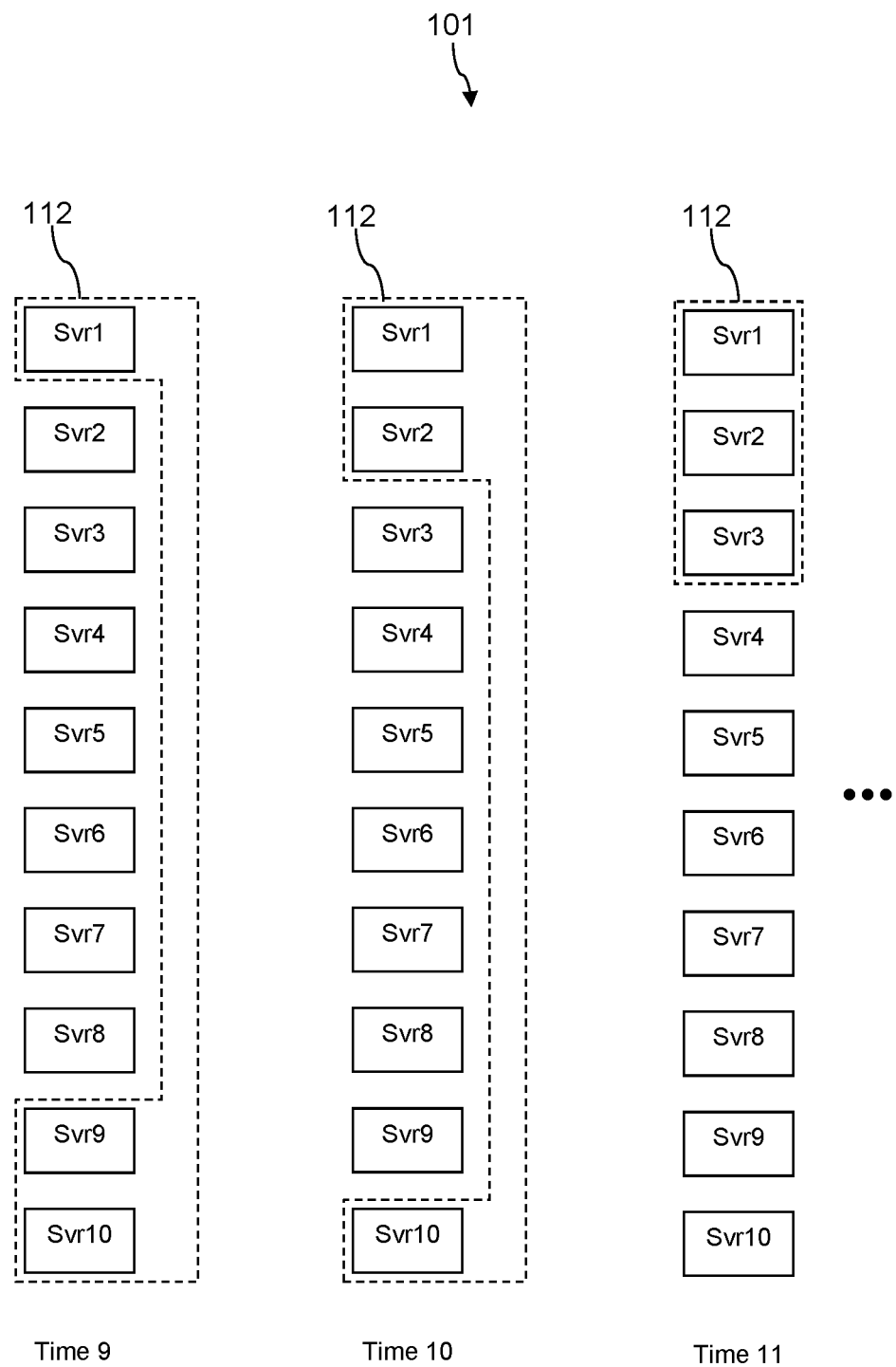

Turning now to FIG. 1B and FIG. 1C, allocation of servers 104, 114 to the pool of traffic handling resources 102 and to the pool of reserve resources 112 over time is described. The production network 101 can be thought to comprise a plurality of substantially similar server computers. For purposes of discussion relative to FIG. 1B and FIG. 1C, ten server computers are illustrated, but it should be understood that a practical production network 101 of a major communication service provider in the United States will in fact comprise thousands of servers, tens of thousands of servers, even possibly hundreds of thousands of servers.

As illustrated in FIG. 1B, at time 1 server 1, server 2, and sever 3 are allocated to the pool of reserve resources 112 and server 4, server 5, server 6, server 7, server 8, server 9, and server 10 are allocated to the pool of traffic handling resources 102. Server 1, server 2, server 3, . . . , server 9, and server 10 can all be considered to be among the servers 104, 114 illustrated in FIG. 1A. This allocation comprises an allocation of 70% of production resources to traffic handling roles and 30% of production resources to reserve or standby roles. In another embodiment, the ratio of production resources allocated to traffic handling roles to production resources allocated to reserve roles may be different. For example, 50% of the production resources may be allocated to traffic handling roles and 50% of the production resources may be allocated to reserve or standby roles. For example, 80% of the production resources may be allocated to traffic handling roles and 20% of the production resources may be allocated to reserve or standby roles. Over time, the ratio of distribution of production resources among traffic handling roles and reserve or standby roles may change, as for example during traffic peak load periods.

At a second time server 2, server 3, and server 4 are allocated to the pool of reserve resources 112 and the remaining servers are allocated to the pool of traffic handling resources 102. At a third time server 3, server 4, and server 5 are allocated to the pool of reserve resources 112 and the remaining servers are allocated to the pool of traffic handling resources 102. The allocation of servers can change during a fourth time, a fifth time, a sixth time, and a seventh time in a similar way but are not illustrated. At an eighth time server 8, server 9, and server 10 are allocated to the pool of reserve resources 112 and the remaining servers are allocated to the pool of traffic handling resources 102. At a ninth time, server 9, server 10, and server 1 are allocated to the pool of reserve resources 112 and the remaining servers are allocated to the pool of traffic handling resources 102. At a tenth time, server 10, server 1, and server 2 are allocated to the pool of reserve resources 112 and the remaining servers are allocated to the pool of traffic handling resources 102. At an eleventh time, server 1, server 2, and server 3 are allocated to the pool of reserve resources 112 and the remaining servers are allocated to the pool of traffic handling resources 102. The allocation of servers among the pool of traffic handling resources 102 and the reserve or standby resources 112 at the eleventh time has come full circle back to the allocation of time 1. This may be referred to as a rolling allocation of servers among the pool of traffic handling resources 102 and the pool of reserve resources 112.

It is this rolling allocation of servers among the pool of traffic handling resources 102 and the pool of reserve resources 112 that, in part, gives the name to the rolling production testing. In part the term rolling production testing can refer to rolling the testing through a sequence of end-to-end communication services: testing a first end-to-end communication service, next testing a second end-to-end communication service, next testing a third end-to-end communication service. It may be that each of a plurality of different end-to-end communication services are tested in series using a first pool of reserve resources 112, then the same plurality of end-to-end communication services are tested in series using a second pool of reserve resources 112, and again the same plurality of end-to-end communication services are tested in series using a third pool of reserve resources 112. Alternatively, a first end-to-end communication service may be tested on each of a sequence of different pools of reserve resources 112, then a second end-to-end communication service may be tested on each of the sequence of different pools of reserve resources, and then a third end-to-end communication service may be tested on each of the sequence of different pools of reserve resources.

By the test application 132 performing the rolling production testing over an extended period of time, the testing is performed on different ones of the servers 104, 114 in the production network 101. Over sufficient time, all of the servers 104, 114 may be tested for a wide range of end-to-end services and for a wide range of different randomly introduced errors. When network traffic loads are deemed to be approaching a peak load condition, servers currently in the pool of reserve resources 112 may have their participation on rolling production testing interrupted and they may be recruited to the pool of traffic handling resources 102 to help carry the peak traffic load. As the peak of traffic subsides, one or more of the servers recruited to the pool of traffic handling resources 102 may be returned or reallocated to the pool of reserve resources 112 and resume rolling production testing. It is understood that the allocation of production resources to the pool of traffic handling resources 102 and to the pool of reserve resources 112 can follow other patterns and may not be neatly sequential as in the example discussed with reference to FIG. 1B and FIG. 1C. Additionally, some servers 104, 114 may not spend equal amounts of time in either a traffic handling role or a reserve role.

Figure 2A:
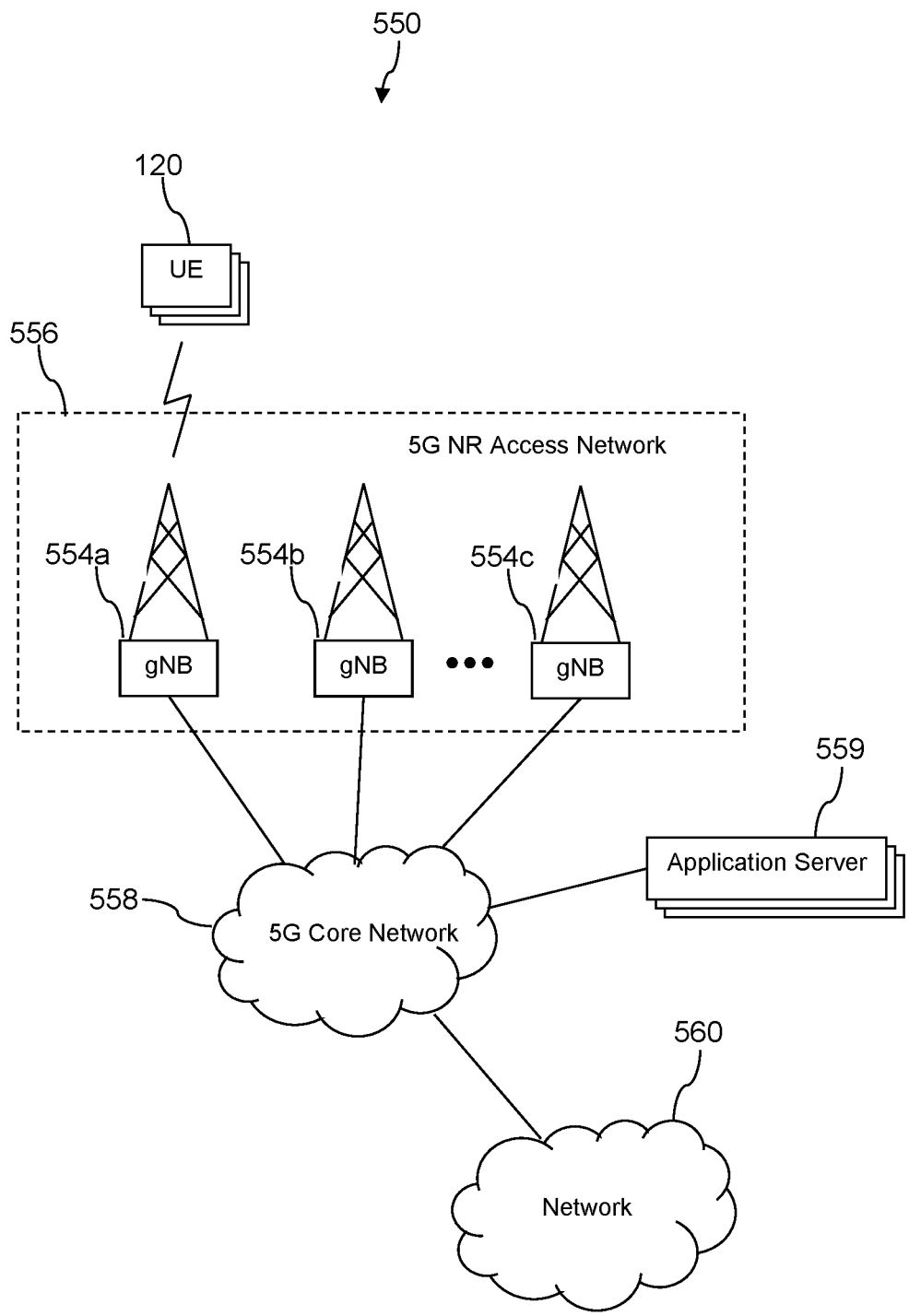
FIG. 2A is a block diagram of a 5G communication network according to an embodiment of the disclosure.

Turning now to FIG. 2A, an exemplary communication system 550 is described. Typically, the communication system 550 includes a number of access nodes 554 that are configured to provide coverage in which UEs 120 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a basic station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554*a*, a second access node 554*b*, and a third access node 554*c*. It is understood that the access network 556 may include any number of access nodes 554. Further, each access node 554 could be coupled with a core network 558 that provides connectivity with various application servers 559 and/or a network 560. The core network 558 may be part of the production network 101 described above with reference to FIG. 1A. In an embodiment, at least some of the application servers 559 may be located close to the network edge (e.g., geographically close to the UE 120 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 120 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 120 defining a downlink or forward link and communications from the UEs 120 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 120.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and sub-carrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 120.

In addition, certain resource elements on the example air interface could be reserved for special purposes. For instance, on the downlink, certain resource elements could be reserved to carry synchronization signals that UEs 120 could detect as an indication of the presence of coverage and to establish frame timing, other resource elements could be reserved to carry a reference signal that UEs 120 could measure in order to determine coverage strength, and still other resource elements could be reserved to carry other control signaling such as PRB-scheduling directives and acknowledgement messaging from the access node 554 to served UEs 120. And on the uplink, certain resource elements could be reserved to carry random access signaling from UEs 120 to the access node 554, and other resource elements could be reserved to carry other control signaling such as PRB-scheduling requests and acknowledgement signaling from UEs 120 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 2B:
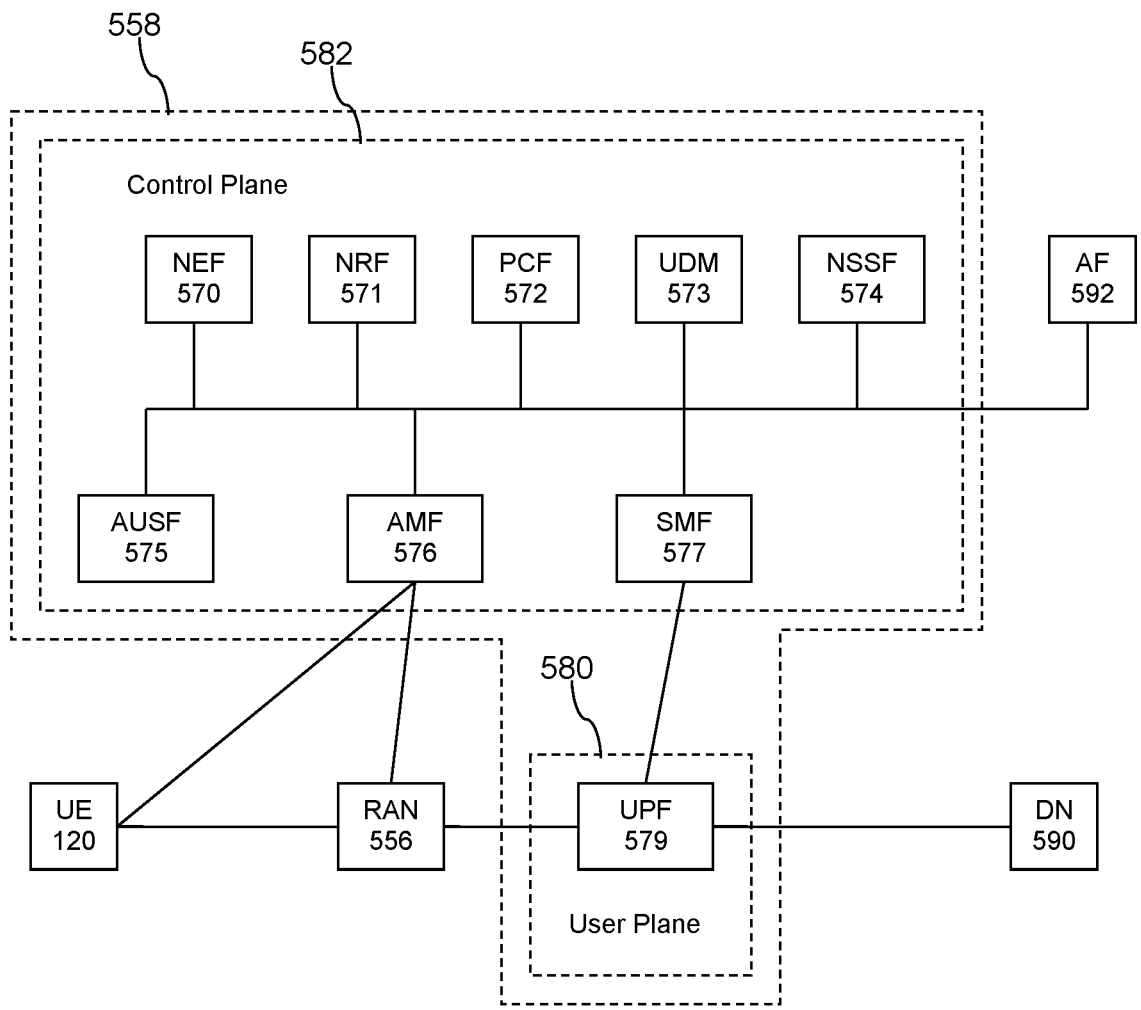
FIG. 2B is another block diagram of a 5G communication network according to an embodiment of the disclosure.

Turning now to FIG. 2B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 120, via the access network 556, to a data network 590 (e.g., the network 560 illustrated in FIG. 2A). The AMF 576 handles registration and connection management of non-access stratum (NAS) signaling with the UE 120. Said in other words, the AMF 576 manages UE registration and mobility issues. The AMF 576 manages reachability of the UEs 120 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 120 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 120.

Figure 3:
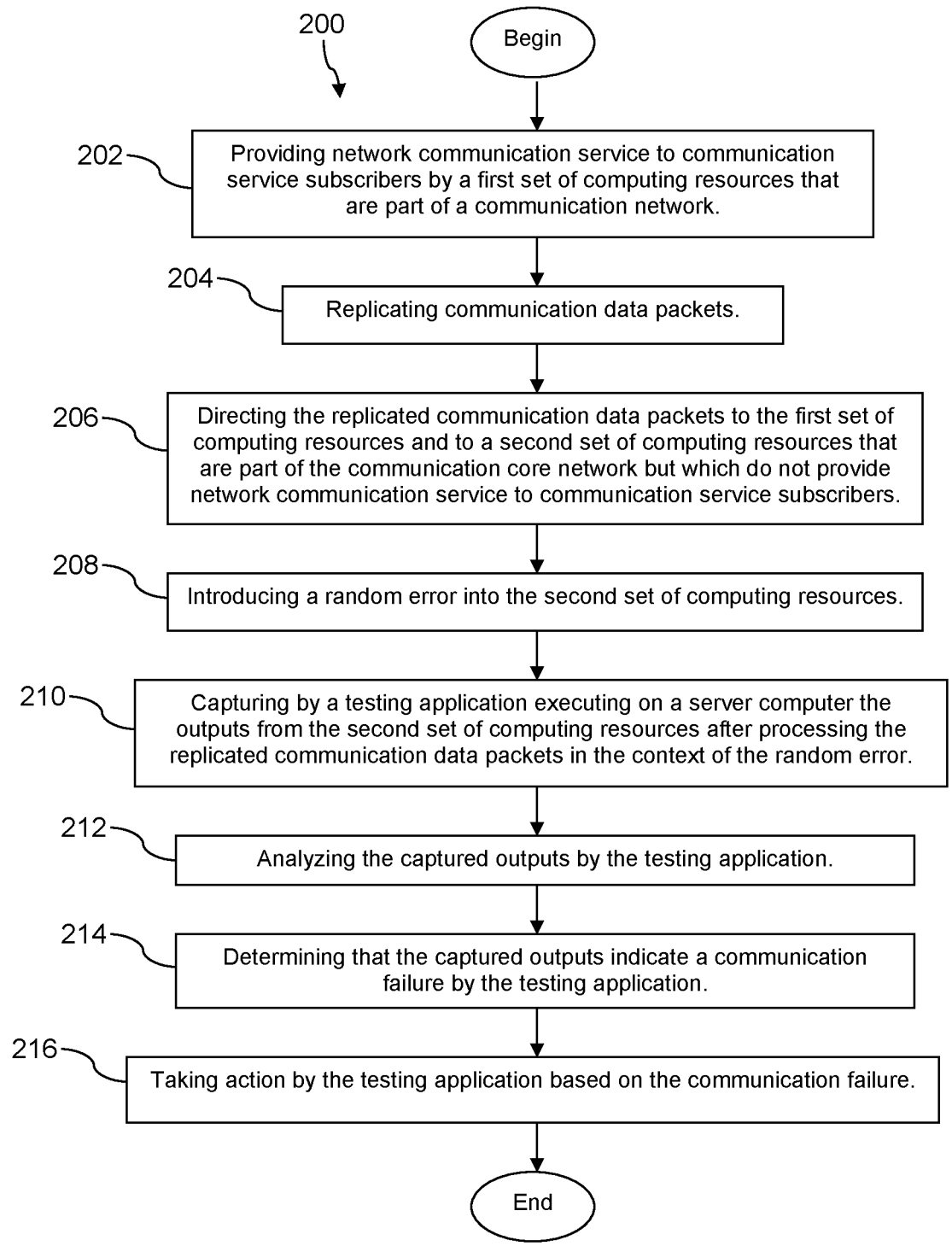
FIG. 3 is a flow chart of a method according to an embodiment of the disclosure.

Turning now to FIG. 3, a method 200 is described. In an embodiment, the method 200 is a method of testing a communication core network. At block 202, the method 200 comprises providing network communication service to communication service subscribers by a first set of computing resources that are part of a communication core network. At block 204, the method 200 comprises replicating communication data packets. At block 206, the method 200 comprises directing the replicated communication data packets to the first set of computing resources and to a second set of computing resources that are part of the communication core network but which do not provide network communication service to communication service subscribers. In an embodiment, the second set of computing resources provide an end-to-end communication service and analyzing the captured outputs by the testing application comprises evaluating the end-to-end communication service function. The end-to-end communication service comprise one or more of a user equipment (UE) registration, a UE deregistration, a UE network authentication and authorization, a UE and network slice negotiation/selection, a UE protocol data unit (PDU) session establishment, a UE edge-based PDU session establishment, a UE hand-over of PDU sessions due to mobility, a UE initiates voice-over-new radio (NR) call, or an application function installs policies for a UE application session.

At block 208, the method 200 comprises introducing a random error into the second set of computing resources. In an embodiment, introducing a random error comprises introducing a misconfiguration of a domain name service (DNS) server intended to be a secondary DNS server and then swapping domain name service (DNS) primary and secondary IP addresses, injecting a communication traffic delay, injecting malformed data packets, or introducing an application function failure into the second set of computing resources. In an embodiment, introducing a random error comprises introducing a network function failure to respond, introducing a router failure, introducing a simulated failure of a communication link, or introducing a load balancer failure into the second set of computing resources.

At block 210, the method 200 comprises capturing by a testing application executing on a server computer the outputs from the second set of computing resources after processing the replicated communication data packets in the context of the random error. At block 212, the method 200 comprises analyzing the captured outputs by the testing application. In an embodiment, analyzing the captured outputs by the testing application comprises determining service level key performance indicators (KPIs) for the end-to-end communication service. In an embodiment, the KPIs comprise a network attach success rate, a mobility success rate, an average upstream data rate, an average downstream data rate, a peak data rate, a service latency, a service reliability score, a service availability score, a service setup time, or a service experience quality score.

At block 214, the method 200 comprises determining that the captured outputs indicate a communication failure by the testing application. At block 216, the method 200 comprises taking action by the testing application based on the communication failure.

Figure 4:
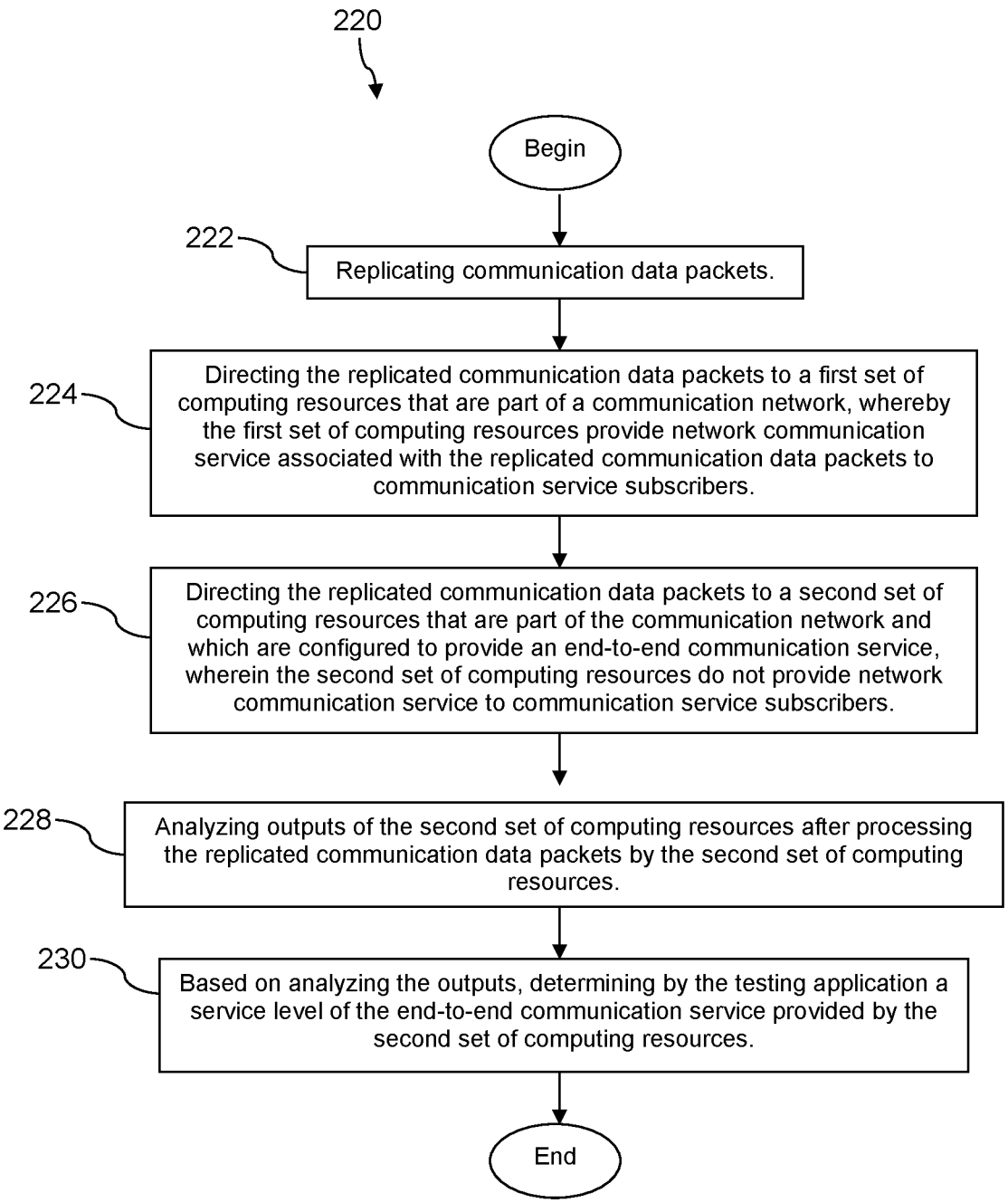
FIG. 4 is a flow chart of another method according to an embodiment of the disclosure.

Turning now to FIG. 4 a method 220 is described. In an embodiment, method 220 is a method of testing a service level provided by a communication network. At block 222, method 220 comprises replicating communication data packets.

At block 224, method 220 comprises directing the replicated communication data packets to a first set of computing resources that are part of a communication network, whereby the first set of computing resources provide network communication service associated with the replicated communication data packets to communication service subscribers. In an embodiment, the network communication service provided to communication service subscribers by the first set of computing resources comprise providing voice communication service, streaming audio communication service, streaming video communication service, or application communication service. In an embodiment, the first set of computing resources and the second set of computing resources are executing a production software load and the testing comprises a rolling production testing.

At block 226, method 220 comprises directing the replicated communication data packets to a second set of computing resources that are part of the communication network and which are configured to provide an end-to-end communication service, wherein the second set of computing resources do not provide network communication service to communication service subscribers. In an embodiment, the end-to-end communication service is a UE registration, a UE deregistration, a UE network authentication and authorization, a UE and network slice negotiation/selection, a UE protocol data unit (PDU) session establishment, a UE edge-based PDU session establishment, a UE hand-over of PDU sessions due to mobility, a UE initiates voice-over-new radio (NR) call, or an application function installs policies for a UE application session.

At block 228, method 220 comprises analyzing outputs of the second set of computing resources after processing the replicated communication data packets by the second set of computing resources. At block 230, method 220 comprises, based on analyzing the outputs, determining by the testing application a service level of the end-to-end communication service provided by the second set of computing resources. In an embodiment, determining the service level of the end-to-end communication service comprises determining service level key performance indicators (KPIs) for the end-to-end communication service. In an embodiment, the KPIs comprise a network attach success rate, a mobility success rate, an average upstream data rate, an average downstream data rate, a peak data rate, a service latency, a service reliability score, a service availability score, a service setup time, or a service experience quality score.

In an embodiment, at least some of the computing resources allocated to the first set of computing resources at a first time are allocated to the second set of computing resources at a second time and wherein at least some of the computing resources allocated to the second set of computing resources at a third time are allocated to the first set of computing resources at a fourth time.

Figure 5:
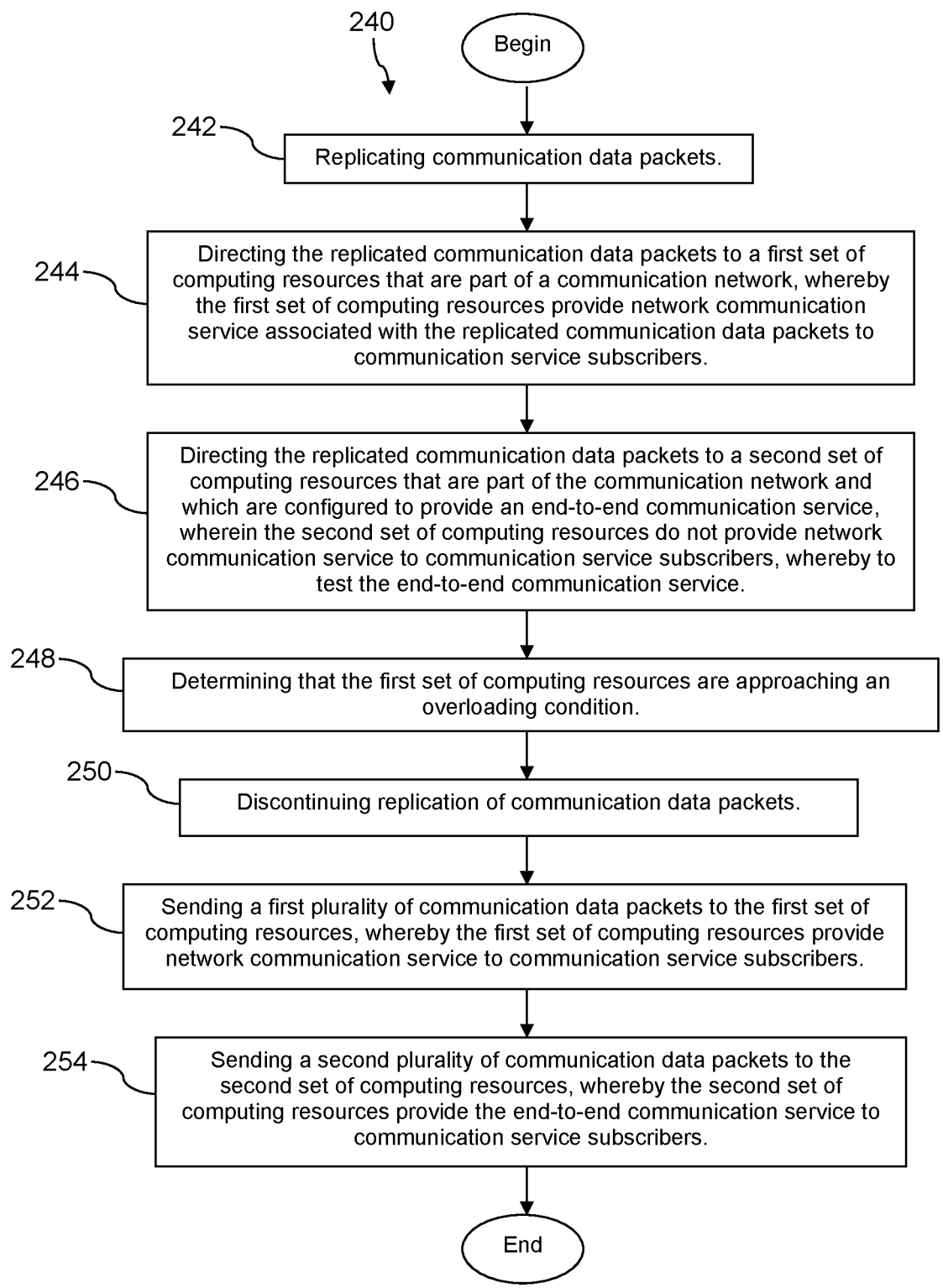
FIG. 5 is a flow chart of yet another method according to an embodiment of the disclosure.

Turning now to FIG. 5, a method 240 is described. In an embodiment, method 240 comprises a method of testing a service level provided by a communication network. At block 242, method 240 comprises replicating communication data packets. At block 244, method 240 comprises directing the replicated communication data packets to a first set of computing resources that are part of a communication network, whereby the first set of computing resources provide network communication service associated with the replicated communication data packets to communication service subscribers. In an embodiment, the network is a 5G network.

At block 246, method 240 comprises directing the replicated communication data packets to a second set of computing resources that are part of the communication network and which are configured to provide an end-to-end communication service, wherein the second set of computing resources do not provide network communication service to communication service subscribers, whereby to test the end-to-end communication service. In an embodiment, the test of the end-to-end communication service is a rolling production test. In an embodiment, the end-to-end communication service is a user equipment (UE) registration, a UE deregistration, a UE network authentication and authorization, a UE and network slice negotiation/selection, a UE protocol data unit (PDU) session establishment, a UE edge-based PDU session establishment, a UE hand-over of PDU sessions due to mobility, a UE initiates voice-over-new radio (NR) call, or an application function installs policies for a UE application session.

At block 248, method 240 comprises determining that the first set of computing resources are approaching an overloading condition. The overloading condition may be the result of increasing communication traffic but it may be a result of other factors, also, such as periodic processing not directly tied to current communication traffic loads. Optionally, at block 250, method 240 may comprise discontinuing replication of communication data packets. Alternatively, method 240 may not discontinue replication of communication data packets.

At block 252, method 240 comprises sending a first plurality of communication data packets to the first set of computing resources, whereby the first set of computing resources provide network communication service to communication service subscribers. In an embodiment, after determining that the first set of computing resources are approaching the overloading condition and before sending the second plurality of communication data packets to the second set of computing resources, instantiating a network function on at least one computing resource in the second set of computing resources that was not previously executing on that computing resource in the second set of computing resources.

At block 254, method 240 comprises sending a second plurality of communication data packets to the second set of computing resources, whereby the second set of computing resources provide the end-to-end communication service to communication service subscribers.

In an embodiment, after sending the second plurality of communication data packets to the second set of computing resources, the method may further comprise determining that the overloading condition has subsided and, after determining the overloading condition has subsided, resuming direction of replicated communication data packets to the second set of computing resources. For example, after an overloading condition has passed, at least some of the computing resources in the second set of computing resources may be returned to a reserve role and be again available for rolling production testing. In an embodiment, the method 240 further comprises configuring the second set of computing resources to provide a second end-to-end communication service, whereby to test the second end-to-end communication service; and after completing testing the second end-to-end communication service, configuring the second set of computing resources to provide a third end-to-end communication service, whereby to test the third end-to-end communication service.

Figure 6:
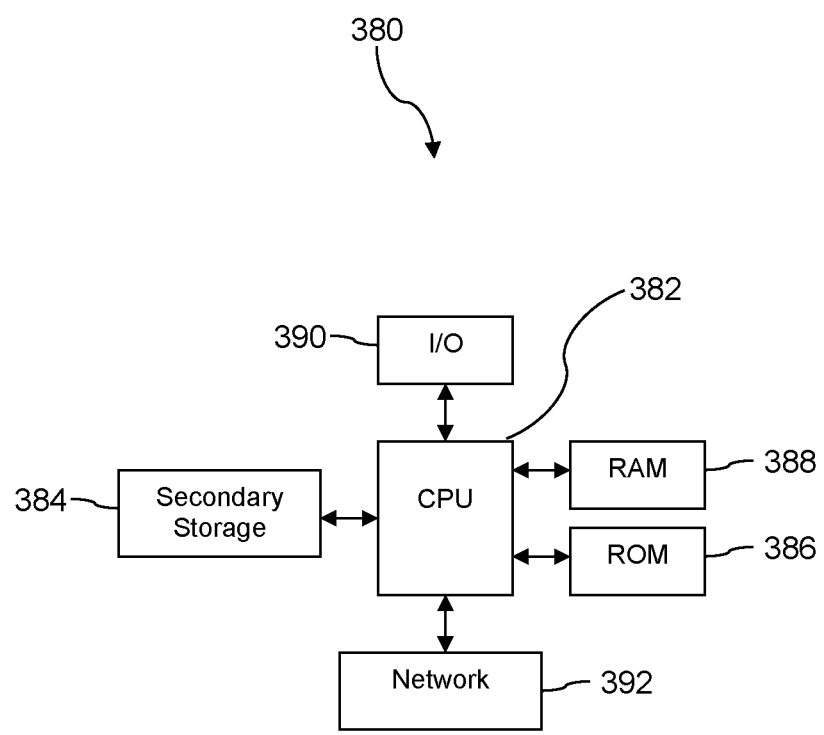
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G or 5G New Radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of testing a communication network, comprising:
    providing network communication service to communication service subscribers by a first set of computing resources that are part of a communication network;
    replicating communication data packets;
    directing the replicated communication data packets to the first set of computing resources and to a second set of computing resources that are part of the communication network but which do not provide network communication service to communication service subscribers, wherein the second set of computing resources provide an end-to-end communication service;
    introducing a random error into the second set of computing resources;
    capturing, by a testing application executing on a server computer, outputs from the second set of computing resources after processing the replicated communication data packets in the context of the random error;
    analyzing the captured outputs by the testing application, wherein analyzing the captured outputs by the testing application comprises evaluating the end-to-end communication service and determining service level key performance indicators (KPIs) for the end-to-end communication service;
    determining that the captured outputs indicate a communication failure by the testing application; and
    taking action by the testing application based on the communication failure.

2. The method of claim 1, where the end-to-end communication service is a user equipment (UE) registration, a UE deregistration, a UE network authentication and authorization, a UE and network slice negotiation/selection, a UE protocol data unit (PDU) session establishment, a UE edge-based PDU session establishment, a UE hand-over of PDU sessions due to mobility, a UE initiates voice-over-new radio (NR) call, or an application function installs policies for a UE application session.

3. The method of claim 1, wherein the KPIs comprise a network attach success rate, a mobility success rate, an average upstream data rate, an average downstream data rate, a peak data rate, a service latency, a service reliability score, a service availability score, a service setup time, or a service experience quality score.

4. The method of claim 1, wherein introducing a random error comprises introducing a misconfiguration of a domain name service (DNS) server intended to be a secondary DNS server and then swapping domain name service (DNS) primary and secondary IP addresses, injecting a communication traffic delay, injecting malformed data packets, or introducing an application function failure into the second set of computing resources.

5. The method of claim 1, wherein introducing a random error comprises introducing a network function failure to respond, introducing a router failure, simulating a failure of a communication link, or introducing a load balancer failure into the second set of computing resources.

6. A method of testing a service level provided by a communication network, comprising:
    replicating communication data packets;
    directing the replicated communication data packets to a first set of computing resources that are part of a communication network, whereby the first set of computing resources provide network communication service associated with the replicated communication data packets to communication service subscribers;

directing the replicated communication data packets to a second set of computing resources that are part of the communication network and which are configured to provide an end-to-end communication service, wherein the second set of computing resources do not provide network communication service to communication service subscribers;

analyzing, by a testing application executing on a computer system, outputs of the second set of computing resources after processing the replicated communication data packets by the second set of computing resources, wherein analyzing the outputs by the testing application comprises evaluating the end-to-end communication service and determining service level key performance indicators (KPIs) for the end-to-end communication service; and based on analyzing the outputs, determining by the testing application a service level of the end-to-end communication service provided by the second set of computing resources.

7. The method of claim 6, wherein the first set of computing resources and the second set of computing resources are executing a production software load and wherein the testing comprises a rolling production testing.

8. The method of claim 7, wherein at least some of the computing resources allocated to the first set of computing resources at a first time are allocated to the second set of computing resources at a second time and wherein at least some of the computing resources allocated to the second set of computing resources at a third time are allocated to the first set of computing resources at a fourth time.

9. The method of claim 6, wherein the KPIs comprise a network attach success rate, a mobility success rate, an average upstream data rate, an average downstream data rate, a peak data rate, a service latency, a service reliability score, a service availability score, a service setup time, or a service experience quality score.

10. The method of claim 6, wherein the network communication service provided to communication service subscribers by the first set of computing resources comprise providing voice communication service, streaming audio communication service, streaming video communication service, or application communication service.

11. The method of claim 6, wherein the end-to-end communication service is a UE registration, a UE deregistration, a UE network authentication and authorization, a UE and network slice negotiation/selection, a UE protocol data unit (PDU) session establishment, a UE edge-based PDU session establishment, a UE hand-over of PDU sessions due to mobility, a UE initiates voice-over-new radio (NR) call, or an application function installs policies for a UE application session.

12. A method of testing a service level provided by a communication network, comprising:

replicating communication data packets;

directing the replicated communication data packets to a first set of computing resources that are part of a communication network, whereby the first set of computing resources provide network communication service associated with the replicated communication data packets to communication service subscribers;

directing the replicated communication data packets to a second set of computing resources that are part of the communication network and which are configured to provide an end-to-end communication service, wherein the second set of computing resources do not provide network communication service to communication service subscribers, whereby to test the end-to-end communication service;

analyzing, by a testing application executing on a computer system, outputs of the second set of computing resources after processing the replicated communication data packets by the second set of computing resources, wherein analyzing the outputs by the testing application comprises evaluating the end-to-end communication service and determining service level key performance indicators (KPIs) for the end-to-end communication service;

determining that the first set of computing resources are approaching an overloading condition;

sending a first plurality of communication data packets to the first set of computing resources, whereby the first set of computing resources provide network communication service to communication service subscribers; and sending a second plurality of communication data packets to the second set of computing resources, whereby the second set of computing resources provide the end-to-end communication service to communication service subscribers.

13. The method of claim 12, further comprising, after determining that the first set of computing resources are approaching the overloading condition and before sending the second plurality of communication data packets to the second set of computing resources, instantiating a network function on at least one computing resource in the second set of computing resources that was not previously executing on that computing resource in the second set of computing resources.

14. The method of claim 12, after sending the second plurality of communication data packets to the second set of computing resources, determining that the overloading condition has subsided;

after determining the overloading condition has subsided, resuming direction of replicated communication data packets to the second set of computing resources.

15. The method of claim 12 further comprising:

configuring the second set of computing resources to provide a second end-to-end communication service, whereby to test the second end-to-end communication service; and after completing testing the second end-to-end communication service, configuring the second set of computing resources to provide a third end-to-end communication service, whereby to test the third end-to-end communication service.

16. The method of claim 12, wherein the network is a 5G network.

17. The method of claim 12, wherein the end-to-end communication service is a user equipment (UE) registration, a UE deregistration, a UE network authentication and authorization, a UE and network slice negotiation/selection, a UE protocol data unit (PDU) session establishment, a UE edge-based PDU session establishment, a UE hand-over of PDU sessions due to mobility, a UE initiates voice-over-new radio (NR) call, or an application function installs policies for a UE application session.

\* \* \* \* \*